United States Patent [19]
Nelson

[11] 4,306,820
[45] Dec. 22, 1981

[54] ROD RETAINER

[75] Inventor: John F. Nelson, New Lenox, Ill.

[73] Assignee: Illinois Tool Works Inc., Chicago, Ill.

[21] Appl. No.: 181,498

[22] Filed: Aug. 26, 1980

[51] Int. Cl.³ .............................................. F16C 11/00
[52] U.S. Cl. .......................................... 403/13; 403/71
[58] Field of Search ...................... 403/69, 71, 70, 13, 403/14, 330, 322, 195; 248/74 A, 74 PB; 24/73 PB, 73 AP

[56] References Cited

U.S. PATENT DOCUMENTS

| | | | |
|---|---|---|---|
| 3,695,652 | 10/1972 | Ratnikas | 403/71 X |
| 3,991,960 | 11/1976 | Tanaka | 248/74 PB X |
| 3,993,410 | 11/1976 | Lindsay, Jr. | 403/71 X |
| 4,240,604 | 12/1980 | Brach | 248/74 R |

Primary Examiner—Andrew V. Kundrat
Attorney, Agent, or Firm—J. R. Halvorsen; T. W. Buckman

[57] ABSTRACT

There is disclosed a new and improved rod retainer for connecting an elongated actuating rod terminating in a short right angle end portion to an apertured lever. The retainer includes a unique hinged rod receiving member which is initially disposed in an opened position for partially receiving the rod. After receiving the rod, the hinged member automatically pivots towards a cooperating wall upon further displacement of the rod toward the retainer until the hinged member automatically lockingly engages the cooperating wall. In the locked position, the rod is securely held between the hinged member and the cooperating wall.

7 Claims, 4 Drawing Figures

ROD RETAINER

BACKGROUND OF THE INVENTION

The present invention is directed generally to rod retainers and more particularly to a rod retainer for connecting an actuating rod having a right angle end to an apertured lever.

Rod retainers for connecting actuating rods having right angle ends to apertured levers are utilized in many applications. Automobiles represent one environment wherein there are many such applications. For example, rod retainers of this type are used in automobile door locking actuators and carberators linkages.

In such applications, where prior art rod retainers have been used, the rod retainer is secured to an apertured lever by a shouldered extension being inserted into the aperture of the lever. The shouldered extension also has an aperture aligned with the lever aperture for receiving the right angle end of the rod. The rod at a portion displaced from the right angle bend is then captured by one or more shouldered recesses formed in walls of the retainer. By virtue of the shouldered extension, the retainer is permitted to pivot on the lever, and because the rod is held by the retainer, the rod is in turn permitted to pivot on the lever.

Prior retainers of this type were found to permit rod removal from the retainers with forces substantially equal to the forces of insertion. This of course is undesirable because of the potential for the rod to be released from the retainer. If this should occur for example in a door locking actuator, substantial disassembly of the door is required to permit correction of the problem. Furthermore, blind assembly of the actuating rods to the levers is often required in automobile assembly lines. Unfortunately, retainers of the prior art have been difficult to install under such circumstances.

In answer to these disadvantages, a retainer fully disclosed and claimed in Lindsay, Jr., U.S. Pat. No. 3,993,410, which patent is assigned to the assignee of the present invention, was developed. That retainer provided substantially easier blind assembly and improved rod retention. The present invention represents a further improvement over the retainer disclosed in that patent inasmuch as little, if any, manipulation of the retainer is required during assembly to a rod and lever while still assuring retention of the rod with maximum integrity. Furthermore, the rod retainer of the present invention provides a ready indication to an operator if the rod is not securely retained and locked within the retainer.

It is therefore a general object of the present invention to provide a new and improved rod retainer for capturing and fixing an elongated member to a work surface.

It is a further object of the present invention to provide such a retainer particularly adapted for connecting an actuating rod having a right angle end portion to an apertured lever member.

As a further object of the present invention to provide such a rod retainer which is automatically locking when a rod is applied thereto.

It is a still further object of the present invention to provide such a retainer which is a plastic one-piece construction.

SUMMARY OF THE INVENTION

The present invention therefore provides a retainer for capturing and fixing an elongated member to a work surface. The retainer includes a base adapted to be fixed to the work surface, a first member upstanding from the base and including first latch means at its distal end from the base, and a second member having near and distal ends with respect to the base. The second member includes an inner surface portion between its end contoured for partially receiving the transverse dimension of the elongated member and second latch means at its distal end. The retainer further includes a hinge means pivotally connecting the second member to the base at a point intermediate the second member ends for movement towards the first member. The hinge means is further arranged to dispose the second member in an initial position for rceiving the elongated member within the inner surface portion and pivot the second member towards the first member to a final position responsive to displacement of the elongated member towards the base. The first and second latch means are arranged for locking engagement and the first member and the inner surface portion of the second member are arranged to confine the elongated member therebetween when the second member reaches the final position.

The invention further provides a one-piece plastic rod retainer for connecting an elongated actuating rod of a predetermined diameter terminating in a short substantially right angle end portion to an apertured lever member. The rod retainer comprises a base having an aperture at one end thereof for accepting the end portion, a resilient retaining means extending from one side of the base having a bore co-axial and communicating with the base aperture, and shoulder means for cooperating with the lever member for retention of the rod retainer thereto, and a first wall upstanding from the base on the side thereof opposite the retaining means and terminating in a first latch means. The retainer further comprises a second wall extending from the base on the side thereof opposite the retaining means and spaced from the first wall and a pivotal member hingedly joined to the terminating end of the second wall. The pivotal member is arcuate in formation having an inner surface contoured in correspondence to the dimension of the actuating rod for partially receiving the rod therein and has second latch means. The pivotal member is arranged to be in an initial position for receiving the rod as the end thereof is inserted into the base aperture and pivotal towards the first wall upon further displacement of the rod towards the base for lockingly engaging the first and second latch means and for confining the rod between the first wall and the inner surface portion.

BRIEF DESCRIPTION OF THE DRAWINGS

The features of the present invention which are believed to be novel are set forth with particularity in the appended claims. The invention, together with further objects and advantages thereof, may best be understood by making reference to the following description taken in conjunction with the accompanying drawings, in the several figures of which like reference numerals identify identical elements, and wherein:

DESCRIPTION OF THE PREFERRED EMBODIMENT

Figure 1:
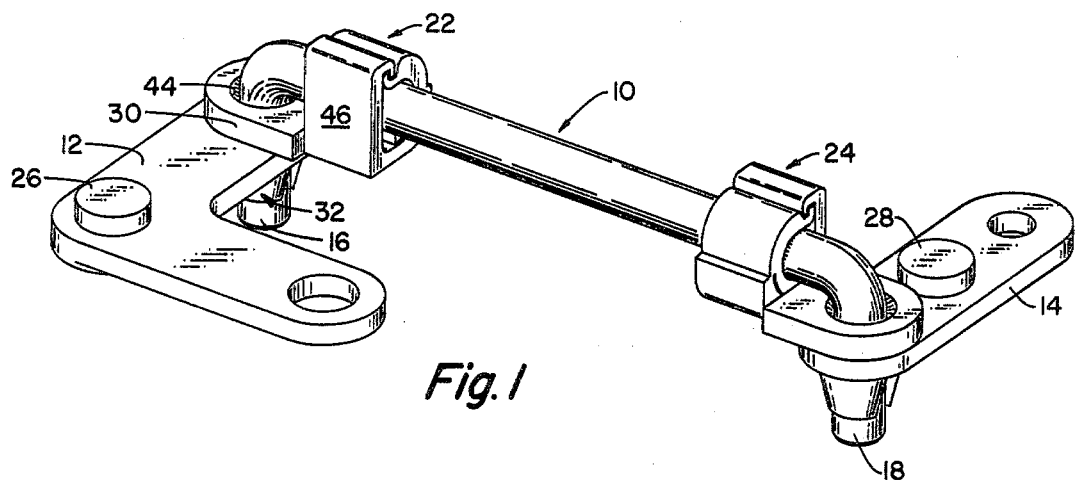
FIG. 1 is a perspective view of an actuating rod or linkage connected between a pair of apertured levers by a corresponding pair of rod retainers embodying the present invention.

Referring now to FIG. 1, an actuating rod (10) is there shown interconnected between a pair of levers (12) and (14). The rod (10) is of the type having short substantially right angled end portions (16) and (18). The levers (12) and (14) constitute work surfaces to which the rod (10) is connected.

Levers (12) and (14) each include an aperture through which the end portions (16) and (18) extend. One such aperture (20) is clearly illustrated in FIG. 2.

The rod retainers (22) and (24) connect the end portions (16) and (18) respectively of the rod (10) to the levers (12) and (14) so that the rod (10) may pivot with respect to the levers while still being maintained in assured connection thereto. The levers (12) and (14) are pivotal about pivot pins (26) and (28) and are arranged to pivot together by virtue of their interconnection by the actuating rod (12) and rod retainers (22) and (24).

Figures 2, 3, 4:
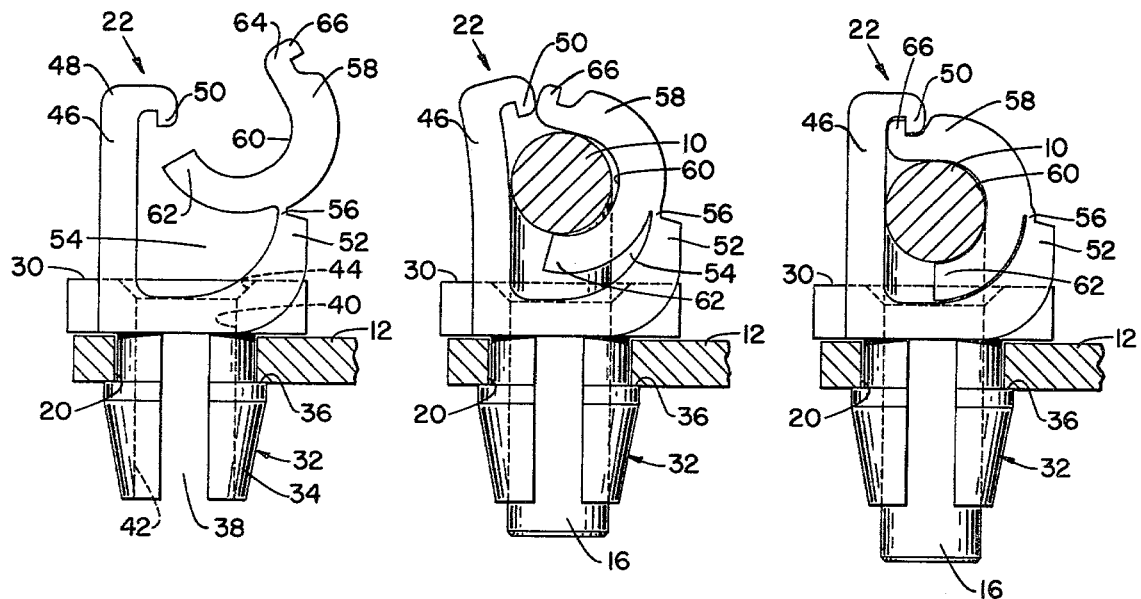
FIG. 2 is a front plan view of one of the rod retainers of FIG. 1 illustrating the same in an initial condition prior to assembly of the actuator rod thereto.
FIG. 3 is a front plan view similar to FIG. 2 but illustrating the operation of the rod retainer as an actuating rod is assembled thereto.
FIG. 4 is a front plan view similar to FIG. 3 but illustrating the rod retainer in a locked condition about the retained actuating rod.

Referring now to FIG. 2, the rod retainer (22), which is identical to the rod retainer (24), is preferably a one-piece thermal plastically molded product which can be fabricated from nylon or other similar materials with the capacity of being rigid when formed in heavy sections and resilient when formed in thinner sections. The retainer (22) includes a base (30) adapted to be secured to the work surface or lever (12). For securing the base (30) to the lever (12), the base (30) includes a resilient retaining means (32) having a generally cylindrical configuration for acceptance within the aperture (20), a tapered nose portion (34) to facilitate the insertion of the retaining means (32) into the aperture (20), and a shoulder means (36) arranged to engage the underside of the lever (12). The retaining means (32) further has one or more axially extending slots to provide resiliency during the compression of the retaining means or stud (32) as it is inserted into the aperture (20) of the lever (12) until the shoulder (36) passes through the aperture and the stud (32) resiliently expands into locked assembly therewith. The particular configuration of the stud (32) is a matter of choice to those skilled in the art since many forms are available. However, for purposes of this perferred embodiment, the stud (32) is provided with a single axially extending slot (38) to provide a maximum circumferential extent of the shoulder (36) for engagement with the lever arm (12) for maximizing the pull out strength of the stud.

The base (30) also has an aperture (40) which is aligned with a bore (42) formed in the stud (32). The aperture (40) and bore (42) are of equal diameter and, when the stud (32) is received within the aperture (20), the aperture (40) and bore (42) are co-axial with the aperture (20). The aperture (40) and bore (42) are also dimensioned for receiving the end portion (16) of the rod (10) in a manner to be described hereinafter. For guiding the end portion into the aperture (40) and bore (42), the aperture (40) is tapered or circumferentially chamfered at (44).

Extending from the base (30) on the side thereof opposite the stud (32) and axially displaced from the aperture (40) is a first member or wall (46). The wall (46) has a distal end (48) terminating in a downwardly turned hook portion (50) constituting a first latch means.

Also projecting form the base (30) and substantially directly opposite the wall (46) is a second wall (52). The second wall (52) is arcuate in formation and contoured to form an inner space (54). The wall section (52) terminates in a relatively thin connecting portion (56) which interconnects the wall portion (52) to a pivotal member (58). The section (56) is of such a thickness that it forms an integral hinge between the pivotal member (58) and section (52) so that the pivotal member (58) is arranged for movement towards the first member or wall (46).

The pivotal member (58) is also arcuate in formation and includes an inner surface portion (60) which is contoured in general correspondence to the transverse dimension of the rod (10) as may be best seen in FIG. 3. The member (58) has a near end (62) with respect to the base (30) and a distal end (64). The distal end (64) includes an upwardly or outwardly turned hook portion (66) which constitutes a second latch means. As may be noted from FIG. 2, the pivotal member (58) is joined to the wall section (52) at a point intermediate its near end (62) and distal end (64).

The hinge connection (56) is arranged for disposing the pivotal member (58) in an opened position as illustrated in FIG. 2 prior to the assembly of an actuating rod to the retainer (22). The pivotal member (58) defines an arc of more than 180° but substantially less than 360° so that the inner surface (60) is arranged to partially receive the transverse dimension of the rod (10).

Upon assembly of an actuating rod to the lever (12), the stud (32) is first inserted through the aperture (20) of the lever (12) in a manner previously described. Once the retainer (22) is secured to the lever (12), the end portion (16) of the rod (10) is inserted into the chamfered portion (44) of the aperture (44) which guides the end portion (16) into the aperture. Upon partial insertion of the rod end (16) into the aperture (40) and bore (42) of the stud (32), the portion of the rod axially displaced from the end portion (16) will be received by the inner surface portion (60) of the pivotal member (58). Continued displacement of the rod (10) towards the base (30) of the retainer (22) will cause the pivotal member (58) to automatically pivot about the hinge (56).

As will be noted in FIG. 3, as the pivotal member (58) pivots, its portion between the near end (62) and the hinge (56) is received within the inner space (54) formed by the wall portion (52). As will also be noted in FIG. 3, the first latch means (50) and second latch means (66) eventually engage. Because the retainer (22) is formed from plastic material such as nylon, the wall (46) will be resilient and eventually be flexed as illustrated.

Referring now to FIG. 4, it can there be seen that the pivotal member (58) has moved from its initially opened position as shown in FIG. 2 to a final or locked position. The first latch means (50) and second latch means (66) are now lockingly engaged and the rod (10) is securely held between the wall (46) and the inner surface (60) of the pivotal member (58). The portion of the pivotal member (58) between its near end (62) and the hinge (56) is also totally received within the space (54). As a result, the rod retainer (22) is now in a locked position with the rod (10) confined between the wall (46) and the pivotal member (58). Since the first latch means (50) and second latch means (66) are formed by downwardly and upwardly turned hook portions respectively, the connection of the rod (10) to the retainer (22) is assured. The pull-out force required to remove the rod (10) from the retainer is many times the insertion force of the rod into the retainer.

The hinge (56) is not only arranged to dispose the pivotal member (58) in an opened position as shown in FIG. 2, but additionally, its thickness may be chosen so that the pivotal member (58) will exhibit resiliency so as to return to its open position as illustrated in FIG. 2 should the latches (50) and (66) not interlockingly engage. This represents a distinct improvement over prior rod retainers inasmuch as an operator will be instantly advised that complete assembly has not been achieved. Also, this is particularly important, inasmuch as an assembly of rod retainers of this variety to actuating rods is often performed under conditions where the operator cannot see the retainer or the rod.

From the foregoing, it will be appreciated that the present invention provides a new and improved rod retainer for capturing and fixing an elongated member to a work surface. More specifically, the present invention provides a new and improved rod retainer for connecting an elongated actuating rod of a predetermined diameter terminating in a short substantially right angle end portion to an apertured lever. Because the retainer of the instant invention includes the pivotal member (58) disposed in an initial opened position to permit the inner surface (60) to receive the rod (10), the rod may be readily placed onto the retainer even under circumstances where the rod and retainer may not be seen by the operator. Furthermore, the retainer of the present invention is arranged to automatically lock itself about the rod (10) as the rod is displaced toward the retainer base thus negating the need for complex manipulation of the retainer to achieve adequate locking. Furthermore, when the pivotal member (58) reaches its final position, the latch means are lockingly engaged in such a manner that the rod (10) may be removed from the retainer with only extreme difficulty.

While a particular embodiment of the present invention has been shown and described, modifications may be made, and it is therefore intended to cover in the appended claims all such changes and modifications which fall within the true spirit and scope of the invention as defined by said claims.

I claim:

1. A one piece plastic retainer for capturing and fixing an elongated member to a work surface comprising a base adapted to be fixed to the work surface, a first member upstanding from said base and including first latch means at its distal end a predetermined distance from said base; a wall section upstanding from said base and having a height less than said predetermined distance, said wall section disposed in the same direction from said base and spaced from said first member, a second member having near and distal ends with respect to said base, an inner surface portion between said ends generally complimentarily contoured for partially receiving the transverse dimension of the elongated member, and second latch means at the distal end of said second member; and hinge means pivotally connecting said second member to said upstanding wall section at its free end and at a point intermediate said second member's near and distal ends for movement towards said first member and arranged to dispose said second member in an initial position for receiving the elongated member within said inner surface portion and pivot said second member towards said first member to a final position responsive to displacement of the elongated member towards said base, said wall section being contoured and forming an inner space for complimentarily receiving the outer surface of the portion of said second member from said hinge member to said near end therein when said second member is in said final position, said first and second latch means being arranged for locking engagement and said first member and said inner surface portion of said second member being arranged to confine the elongated member therebetween when said second member reaches said final position.

2. A retainer as defined in claim 1 wherein said retainer is of the type for connecting an elongated actuating rod terminating in a short substantially right angle end portion to an apertured lever member and wherein said base includes an aperture laterally spaced from said first and second members for accepting the rod end portion and resilient retaining means extending from the side of said base opposite said first and second members having a bore co-axial and communicating with said base aperture and shoulder means for cooperation with said lever member for retention of said retainer thereto.

3. A retainer as defined in claim 2 wherein said rod member is circular in transverse dimension and wherein said inner surface portion of said second member is arcuate having a contour corresponding to the circular dimension of said rod.

4. A one-piece plastic rod retainer for connecting an elongated actuating rod of a predetermined diameter terminating in a short substantially right angle end portion to an apertured lever member, said rod retainer comprising a base having an aperture at one end thereof for accepting said end portion; a resilient retaining means extending from one side of said base having a bore co-axial and communicating with said base aperture and shoulder means for cooperating with said lever member for retention of said rod retainer thereto; a first wall upstanding from said base on the side thereof opposite said retaining means and terminating in a first latch means; a second wall extending from said base on the side thereof opposite said retaining means and spaced from said first wall; and a pivotal member hingedly joined to the terminating end of said second wall, said member being arcuate in formation having an inner surface contoured in correspondence to the dimension of the actuating rod for partially receiving the rod therein and having second latch means, and said member being in an initial position for receiving the rod as the end thereof is inserted into said base aperture and pivotal towards said first wall upon further displacement of the rod towards said base for lockingly engaging said first and second latch means and for confining the rod between said first wall and said inner surface portion.

5. A rod retainer as defined in claim 4 wherein said pivotal member includes near and distal ends with respect to said base and wherein said member is hingedly joined to said second wall at a point intermediate its ends.

6. A rod retainer as defined in claim 5 wherein said second wall is arcuately contoured in general correspondence to said pivotal member forming an inner space for receiving the portion of said pivotal member from said hinge connection to said near end therein when said first and second latch means are lockingly engaged.

7. A rod retainer as defined in claim 5 wherein said second latch means is at said distal end of said pivotal member.

* * * * *